United States Patent
Holcomb et al.

(10) Patent No.: US 9,447,880 B2
(45) Date of Patent: Sep. 20, 2016

(54) METHOD AND SEALANT FOR SECURING A FIRST HOUSING MEMBER TO A SECOND HOUSING MEMBER OF AN ELECTRONIC DEVICE

(71) Applicant: Google Technology Holdings LLC, Mountain View, CA (US)

(72) Inventors: Ryan P. Holcomb, Mountain View, CA (US); Joseph L. Allore, Mundelein, IL (US); Richard R. Chomko, Lake Villa, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 71 days.

(21) Appl. No.: 14/034,902

(22) Filed: Sep. 24, 2013

(65) Prior Publication Data
US 2014/0265160 A1    Sep. 18, 2014

Related U.S. Application Data

(60) Provisional application No. 61/782,933, filed on Mar. 14, 2013.

(51) Int. Cl.
*B29C 65/00*   (2006.01)
*B32B 37/00*   (2006.01)
(Continued)

(52) U.S. Cl.
CPC .............. *F16J 15/02* (2013.01); *G06F 1/16* (2013.01); *B29C 65/48* (2013.01); *B29C 65/5057* (2013.01);
(Continued)

(58) Field of Classification Search
CPC ... B29C 65/00; B29C 65/48; B29C 65/4805; B29C 65/483; B29C 65/50; B29C 65/5057; B29C 65/5064; B29C 65/5078; B29C 65/72; B29C 66/00; B29C 66/01; B29C 66/05; B29C 66/20; B29C 66/22; B29C 66/24; B29C 66/242; B29C 66/2424; B29C 66/24243; B29C 66/24244; B29C 66/40; B29C 66/41; B29C 66/43; B29C 66/7465; G06F 1/1656; G06F 1/1626; G06F 1/1637; G06F 1/181; G02F 1/133308; G02F 1/1339

USPC ......... 156/60, 90, 108, 290, 291, 292, 295; 277/590, 628, 637, 638, 639, 650, 654, 277/312; 361/600, 679.01, 679.02, 679.21, 361/679.26, 679.3

See application file for complete search history.

(56) References Cited

U.S. PATENT DOCUMENTS

2010/0259707 A1* 10/2010 Iwata ................ G02F 1/133351
                                                     349/73
2011/0151202 A1   6/2011 Feinstein et al.

FOREIGN PATENT DOCUMENTS

WO         2011047094 A2    4/2011
WO    WO 2011047094 A2 *    4/2011  ........... G06F 1/1616
WO         2011096958 A1    8/2011

OTHER PUBLICATIONS

Lu, D. Dr. et al.: "Liquid Optically Clear Adhesives for Display Applications", http://www.henkelna.com/us/content_data/275690_Exhibitors_Forum_abstract.pdf, Feb. 10, 2013, all pages.

(Continued)

*Primary Examiner* — Philip Tucker
*Assistant Examiner* — Brian R Slawski
(74) *Attorney, Agent, or Firm* — Brake Hughes Bellermann LLP

(57) ABSTRACT

A method for securing a first housing member to a second housing member of a device, includes affixing a set of tape adhesive portions to a first section of a perimeter of the second housing member and distributing a liquid adhesive to a second section of the perimeter of the second housing member. The method further includes compressing the liquid adhesive into at least one compressed liquid adhesive portion to create a sealant for securing the first housing member to the perimeter of the second housing member, wherein the sealant comprises the set of tape adhesive portions and the at least one compressed liquid adhesive portion.

11 Claims, 12 Drawing Sheets

(51) Int. Cl.
- *B60J 1/00* (2006.01)
- *E06B 3/00* (2006.01)
- *E06B 5/00* (2006.01)
- *E06B 7/00* (2006.01)
- *B29C 65/48* (2006.01)
- *F16J 15/02* (2006.01)
- *F16J 15/08* (2006.01)
- *F16J 15/10* (2006.01)
- *H05K 7/00* (2006.01)
- *G06F 1/16* (2006.01)
- *B29C 65/50* (2006.01)

(52) U.S. Cl.
CPC ...... *B29C 65/5078* (2013.01); *B29C 66/24244* (2013.01); *B29C 66/43* (2013.01); *Y10T 156/10* (2015.01)

(56) References Cited

OTHER PUBLICATIONS

International Preliminary Report on Patentability for PCT Application No. PCT/US2014/017356, mailed Sep. 24, 2015, 7 pages.

\* cited by examiner

V-shaped end
*1202*

W-shaped end
*1204* oval shaped end
*1206*

METHOD AND SEALANT FOR SECURING A FIRST HOUSING MEMBER TO A SECOND HOUSING MEMBER OF AN ELECTRONIC DEVICE

FIELD OF THE DISCLOSURE

The present disclosure relates generally to sealants for electronic devices and more particularly to a method and sealant for securing a first housing member to a second housing member of an electronic device.

BACKGROUND

Conventional electronic devices, also referred to herein simply as devices, use a liquid adhesive as a sealant to seal together a front lens and a front housing along a perimeter of the front housing. However, the liquid adhesive is difficult to control during the manufacturing process. Particularly, the quantity of liquid adhesive that is applied to the front housing is typically irregular and not consistent in volume, width, and height per rate of application. As a result, there are areas in the housing perimeter of the electronic device where the applied sealant is too voluminous so that, when compressed, the compressed liquid adhesive overflows into electrically sensitive areas of the electronic device. This overflow tends to interfere with the operation of the electronically sensitive parts of the device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
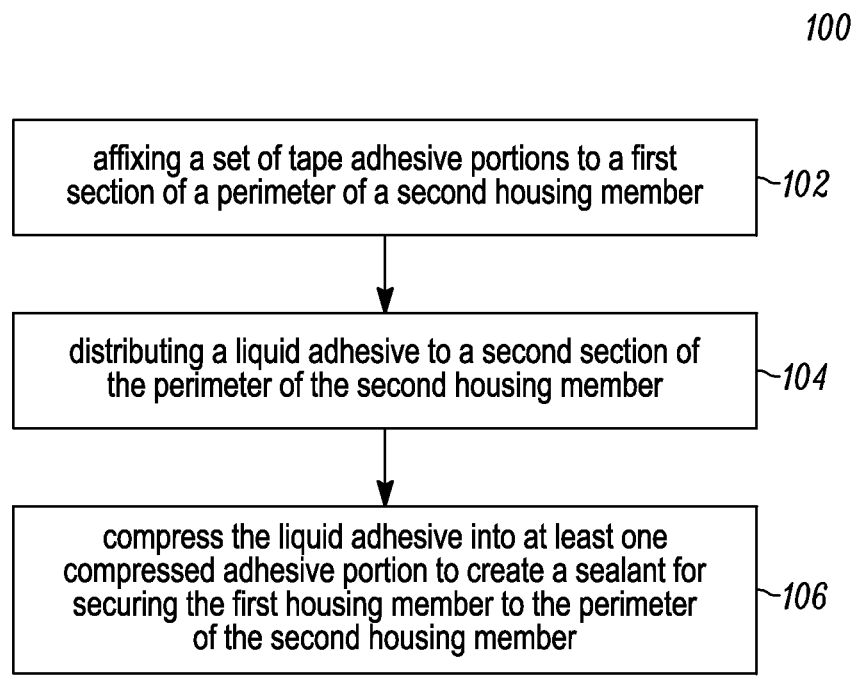
FIG. 1 illustrates a flow diagram of a method for securing a first housing member to a second housing member of a device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the disclosure herein.

The apparatus and method components have been represented where appropriate by conventional symbols in the drawings, showing only those specific details that are pertinent to understanding the embodiments of the disclosure herein so as not to obscure the disclosure with details that will be readily apparent to those of ordinary skill in the art having the benefit of the description herein.

DETAILED DESCRIPTION

Generally speaking, pursuant to various embodiments, the present disclosure provides a sealant having a combination of tape adhesive and liquid adhesive portions joined end-to-end along a perimeter of an electronic device, of which embodiments may provide benefits over a conventional sealant composed of only liquid adhesive. Example benefits include, but are not limited to, any one or more of the following: easier control during manufacturing of the device; a narrower width of the sealant along at least one section, region or portion of a perimeter of an electronic device, allowing for maximizing the display area; a reduction of overflow of liquid adhesive affecting electronically sensitive parts located in the perimeter region of the device; and additional protection to the device, and particularly corner regions of the device, if the device is dropped or otherwise impacts a relatively hard surface.

In one embodiment, a combination of a set of tape adhesive portions and liquid adhesive portions is aligned end-to-end to form a sealant that holds together a first and second housing member of a device, such as a mobile phone housing. By using a set of tape adhesive portions with a set of liquid adhesive portions, and aligning them end-to-end along the length of a perimeter of the second housing member, the resultant sealant is thinner all around and allows for more of the device to be used for display purposes. For example, a liquid adhesive is difficult to control when distributing onto a housing member because the liquid adhesive has inconsistent variable volume, width, and height when dispensed with conventional techniques. These problems become exacerbated when the liquid adhesive is compressed, as it tends to overflow into other areas of the device, such as electronically sensitive parts of the device.

In accordance with an embodiment is a method for securing a first housing member to a second housing member of a device. The method includes affixing a set of tape adhesive portions to a first section of a perimeter of the second housing member and distributing a liquid adhesive to a second section of the perimeter of the second housing member. The method further includes compressing the liquid adhesive into at least one compressed liquid adhesive portion to create a sealant for securing the first housing member to the perimeter of the second housing member, wherein the sealant comprises the set of tape adhesive portions and the at least one compressed liquid adhesive portion.

In accordance with another embodiment is a sealant for securing a first housing member to a second housing member of a device. The sealant includes at least one tape adhesive portion and at least one compressed liquid adhesive portion. The at least one tape adhesive portion and the at least one compressed liquid adhesive portion are arranged along a total length of a perimeter of the second housing member to secure the first housing member to the second housing member.

Referring now to the drawings, and in particular FIG. 1, a method for securing a first housing member to a second housing member of a device in accordance with some embodiments is shown and indicated generally at 100. References are made to embodiments illustrated in the remaining figures to assist in understanding the method 100. For example, the method 100 may be applied during manufacturing of an electronic device, such as a mobile phone device 200 shown in FIG. 2. The mobile phone device 200 includes components, such as an external lens 202, a display 204, a front housing 206, a printed circuit board (PCB) and chassis 208, a battery 210, a rear chassis 212, and a rear cover 214. For purposes of the present teachings, an electronic device is any device that includes at least a first housing member and a second housing member capable of being secured together with a sealant in accordance with embodiments disclosed herein. Such devices further include, but are not limited to, smart phones, personal digital assistants (PDAs), audio- and video-file players (e.g., MP3 players and iPODs), and personal computing devices, such as tablets.

When manufacturing the mobile phone device 200, some components may be coupled together using screws, while others require less invasive forms of attachment. For example, the display 204 and the external lens 202 of the electronic device 200 could break if the lens 202 is secured to the front housing 206 with screw-type attachments. Therefore, these components are affixed together using a sealant. With conventional manufacturing techniques, the external lens 202 and the front housing 206 are secured together with some parts of the front housing 206 extending upward toward the lens 202 to act as standoffs for a liquid adhesive that is applied.

The standoffs are generally made from the same material as the front housing, such as plastic, aluminum, steel, micro arc oxidation processed aluminum, a super-light alloy dubbed liquidmetal, polycarbonate, acrylonitrile butadiene styrene, polycarbonate/acrylonitrile butadiene styrene, HR-1008BN, HI-1001BN, etc., which are generally stiff housing materials and have elastic modulus values as low as 2 GPa for plastics and over 70 GPa for metals. As used herein, "compliance" refers to the stiffness of the material, which is typically characterized by the material's Young's Modulus and/or Bulk Modulus. Tape adhesives, especially those with foam-based carriers reduce the stiffness of the standoff as compared to the typical housing materials. Typically, with the above-mentioned conventional standoff materials, the lens cracks due to a higher impact energy transferring upon the lens. Additionally, with conventional standoff materials, breakage occurs on the device 200 at one or more standoff locations, such as at a corner of the device 200.

In addition, because a goal of mobile phone design is to have the largest display area as possible, some electrical components, including electronically sensitive components or parts, of the device are designed to reside along the perimeter of the device. During conventional manufacturing processes, when the liquid adhesive is compressed, the front housing standoffs are used in an attempt to control the compression of the liquid adhesive. However, despite having the standoffs, because of the difficulty in controlling the distribution of the liquid adhesive, oftentimes, the compressed liquid adhesive overflows into one or more of these electronically sensitive components. This can damage or otherwise interfere with the operation of the electronically sensitive components of the device.

Figure 3:
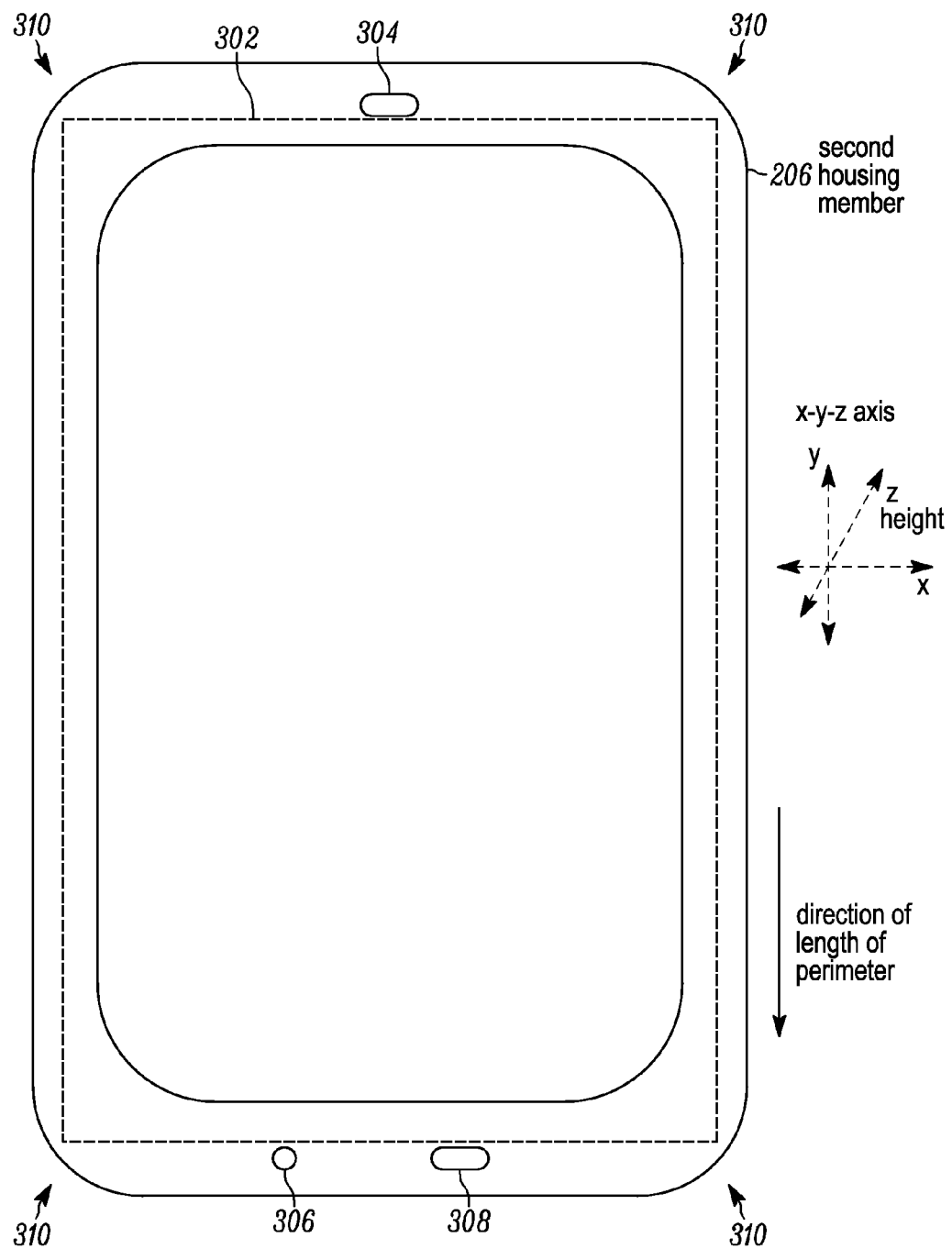
FIG. 3 illustrates a schematic showing a perimeter of a second housing member in accordance with some embodiments.

FIG. 3 illustrates a schematic showing a perimeter 302 of a second housing member 206 having located thereon some electronically sensitive components in accordance with some embodiments. The example perimeter 302 is used to show a general area of the second housing member 206, where the tape and liquid adhesive portions are to be placed. The shape of the perimeter is shown as a rectangle. Other shapes are also included, as illustrated below as being the area under the affixed tape and liquid adhesive portions, such as a rounded corner rectangle. In an embodiment, the perimeter 302 takes on the outer shape of the second housing member. "Electronically sensitive" means that a component or part is susceptible to damage, failure, or impedance of operation when contacted by a foreign object, such as liquid adhesive. Some examples of electronically sensitive parts of a mobile phone device include a camera, speaker, microphone, circuitry, proximity sensor, other sensors, earpiece, imager, sensor opening, display, etc.

As is shown in FIG. 3, the locations of some electronically sensitive parts of the device are designed to be at the perimeter 302 of the housing member 206. These electronically sensitive parts include a camera 304, a microphone 306, and a speaker 308. Some embodiments herein provide a solution to the conventional problem of overflow of the liquid adhesive interfering with electronically sensitive parts of the electronic device, such as 304, 306, and 308. The perimeter 302 illustrated in FIG. 3 is not meant to be limiting. The term "perimeter" is used herein to include an outer edge of an area, such as the outer edge of the second housing member 206.

An embodiment of a perimeter 302 is shown in FIG. 3 resembles a rectangle. However, in another embodiment is a more oval-shaped or a rectangular with rounded corner perimeter 302 lies along a total length around the edge of the second housing member 206. The entire dashed line 302 illustrates a total or entire length of the perimeter that runs parallel to an entire or total length of the outer edge of the second housing member 206. Moreover in different shaped devices, an embodiment of a perimeter 302 of a housing member 206 of the device may take on respective different shapes. Corner regions or locations of the device are indicated at 310.

Figure 2:
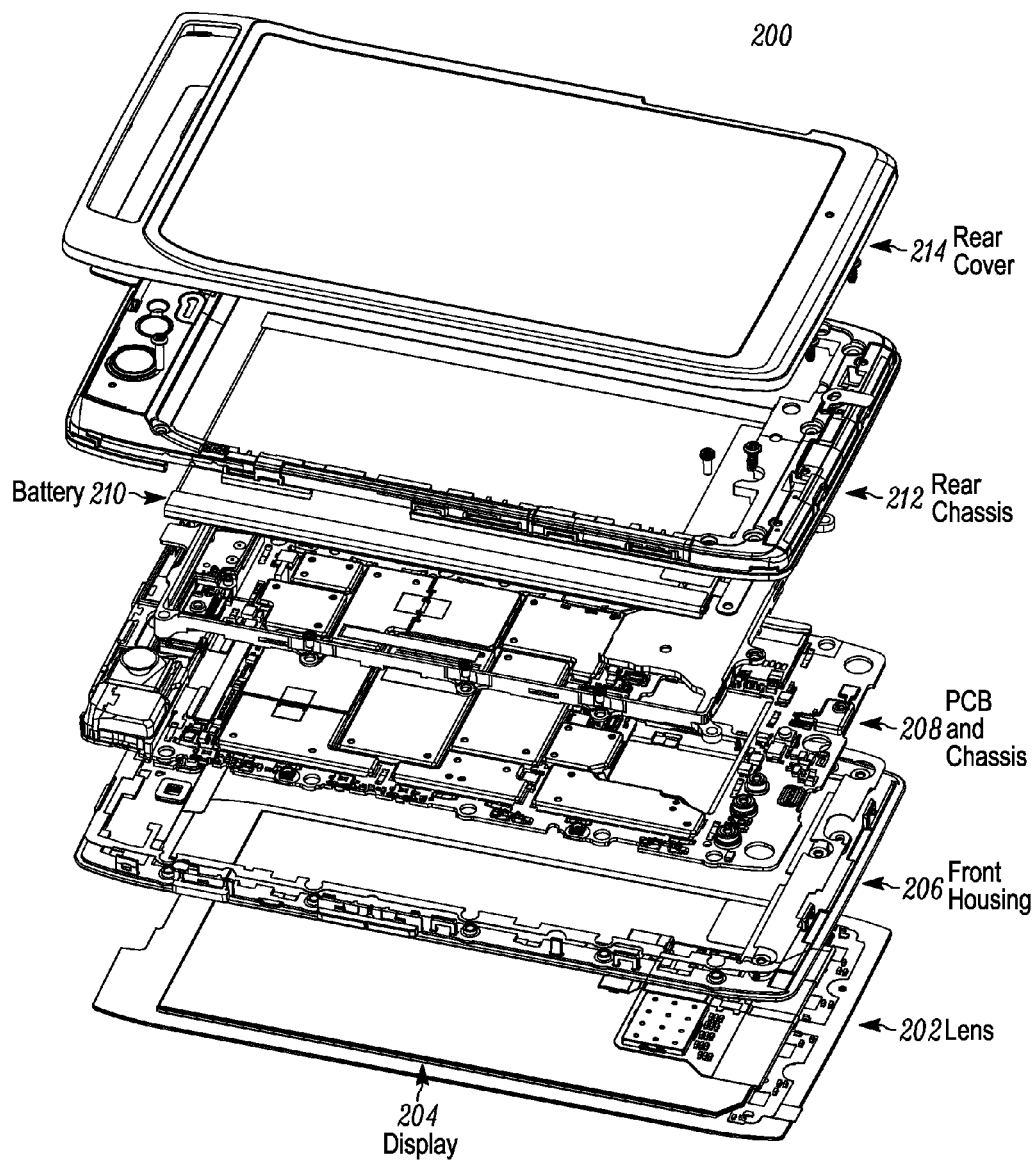
FIG. 2 illustrates an exploded view of a device, such as a mobile phone and its components, which may benefit from the embodiments described herein.

Referring back to FIG. 2, embodiments of the method 100 described herein may be applied to an electronic device, such as the mobile phone device 200 of FIG. 2, for example, when securing the lens 202 to the front housing 206. The lens of FIG. 2 is a type of a first housing member 202, and the front housing in FIG. 2 is a type of a second housing member 206. Other components may also be secured together using the method 100, such as the rear cover 214 and the rear chassis 212 of the mobile phone device 200 of FIG. 2. Other devices, such as tablets, e-books, smart phones, other devices previously mentioned, etc., can benefit from the embodiments described herein. As is described later in this document, in one embodiment, after compression, a set of tape adhesive portions and at least one compressed liquid adhesive portion is distributed end-to-end with each other along the total length of the perimeter 302 to form a continuous sealant along the perimeter 302.

Figure 4:
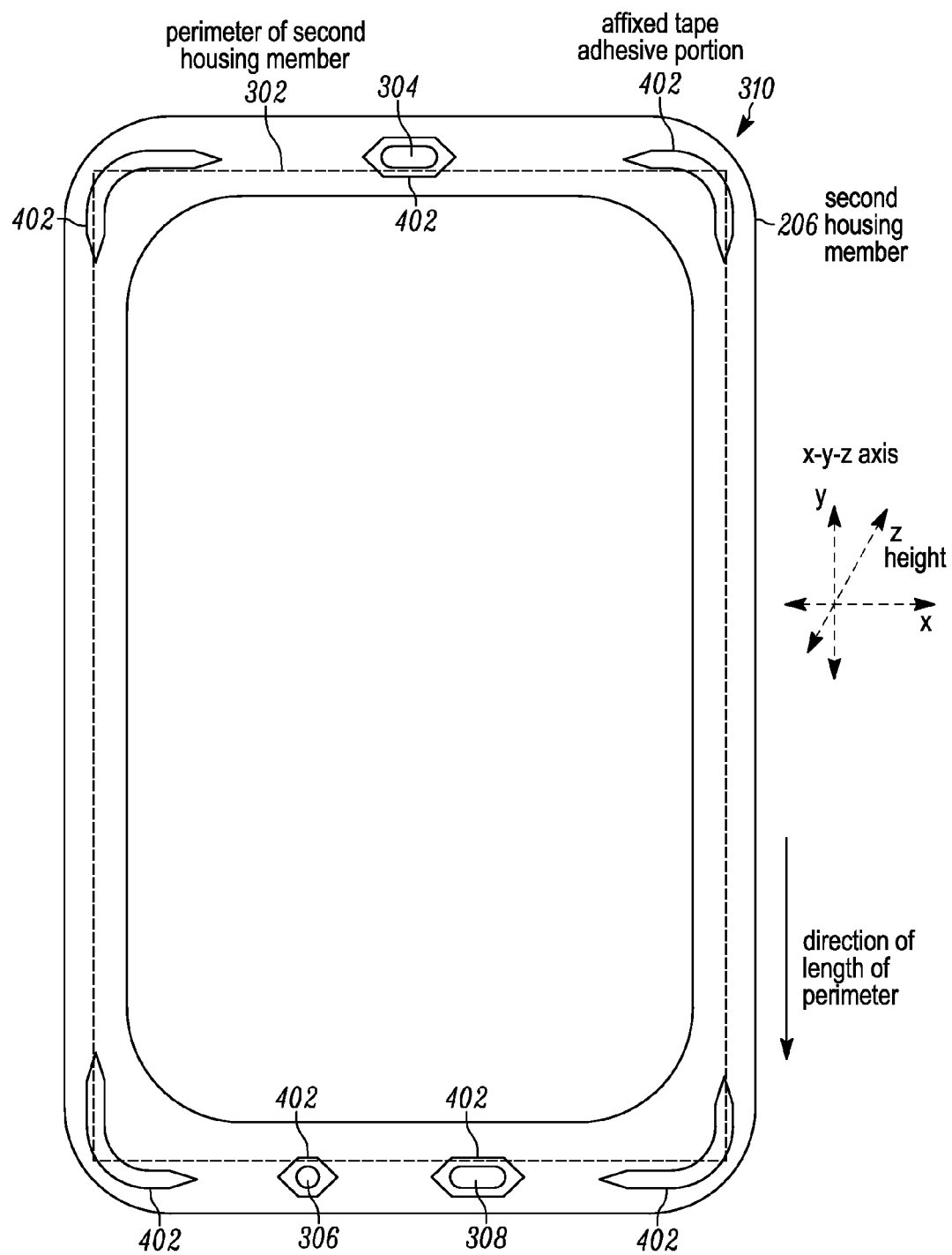
FIG. 4 illustrates a schematic of a second housing member that has tape adhesive affixed in areas of the perimeter in accordance with some embodiments.
Figure 5:
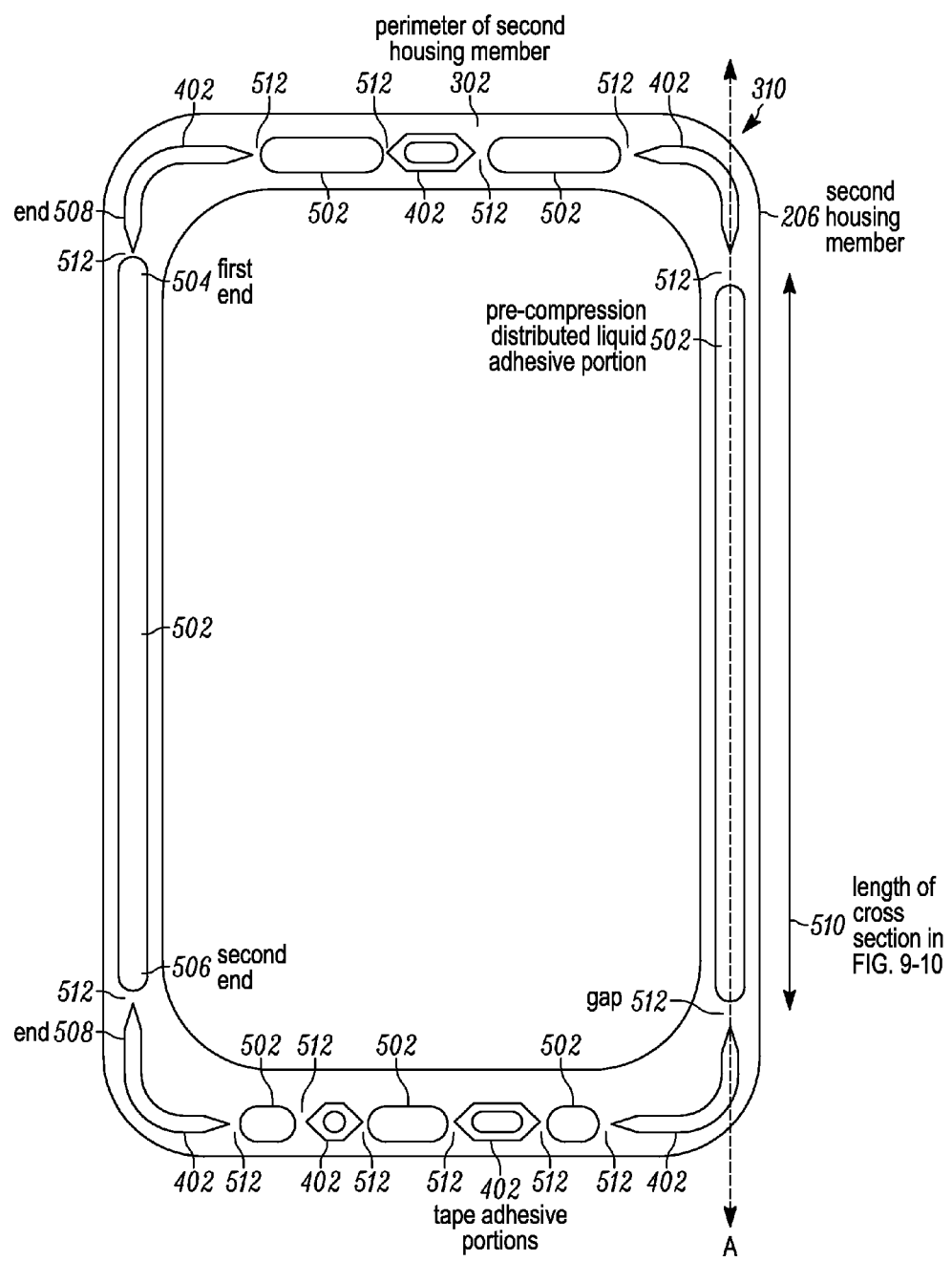
FIG. 5 illustrates a schematic of a second housing member that has liquid adhesive distributed along an area of the perimeter in accordance with some embodiments.
Figure 9:
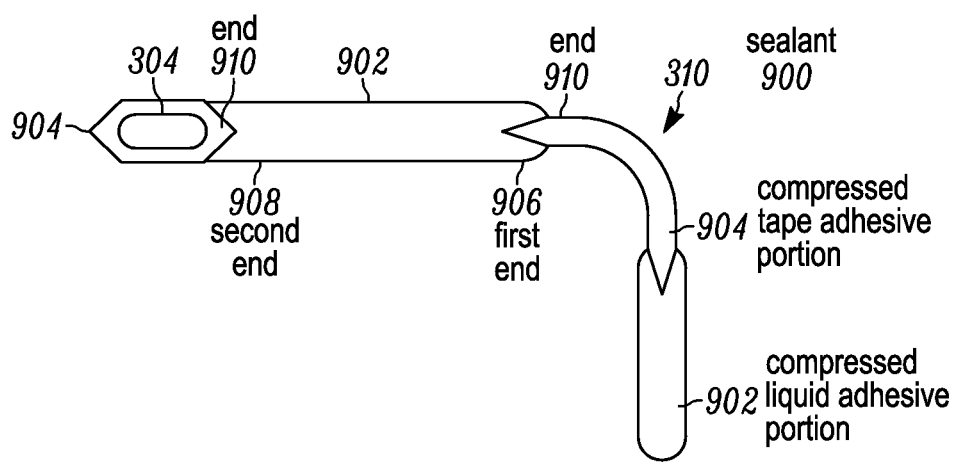
FIG. 9 illustrates a closer view of two tape adhesive portions and two liquid adhesive portions after compression creating a sealant in accordance with some embodiments.

Referring back to FIG. 1, and referring briefly to FIGS. 4, 5, and 9 by way of example, the method 100 includes, affixing 102 a set of tape adhesive portions 402 (seven portions shown) to a first section of a perimeter 302 of a second housing member 206. The method 100 further includes distributing 104 a liquid adhesive 502 (seven portions shown) to a second section of the perimeter 302 of the second housing member 206, and compressing 106 the liquid adhesive 502 into at least one compressed liquid adhesive portion, e.g., 902, to create a sealant 900 for securing a first housing member 202 to the perimeter 302 of the second housing member 206, wherein the sealant comprises the set of tape adhesive portions, e.g., 904, and the at least one compressed liquid adhesive portion 902. A "set" is defined herein to be one or more.

During the device manufacturing process, for instance, the set of tape adhesive portions 402 may be precut and affixed or secured to the perimeter 302 of the second housing member 206 using, for example, an adhesive film (not shown) on one side of the tape. In an embodiment, the tape adhesive portions have dimensions smaller than dimensions of the area, region, section or portion of the perimeter 302 on which the tape is affixed. In a further embodiment, the tape adhesive has openings cut therein to make room for or accommodate one or more electronically sensitive parts of the particular electronic device, which are also located along the perimeter 302.

As shown in FIG. 4, the tape adhesive portions 402 border electronically sensitive parts 304, 306, and 308 and are located in corner regions 310 of the second housing member 206. A benefit is that the tape adhesive can be cut very thin to enable the placing of the tape adhesive portions 402 in small areas around the electrically sensitive parts, for example, to protect them from liquid adhesive overflow, while still providing adhesion and sealant properties. For example, a width of a tape adhesive portion 402 along an x plane running along the perimeter 302 is less than or about 0.5 mm, whereas a minimum or smallest width of a distributed liquid adhesive portion 502 along the x plane running along the perimeter 302 is about three times as much, e.g., 1.5 mm, after compression. Prior to compression, the narrowest the liquid adhesive width can be is about 0.75 mm. At its narrowest, the liquid adhesive typically occurs in the shape of a bead. After compression, the liquid adhesive typically spreads to about 1.5 mm in width. Moreover, with liquid adhesives, a problem that is worse than the spread in width that occurs during compression is the fact that, during compression, the spread in width is not evenly distributed along its longitudinal axis. For example, the tolerance on the positioning of the compressed liquid adhesive is very difficult to control. For example, during compression of the liquid adhesive, the amount of liquid adhesive that ends up spreading to one side of the longitudinal axis of the liquid adhesive portion 502 is not even to the amount that spreads to the other side. More particularly, the tape can be placed in areas on the perimeter 302, e.g., less that 1.5 mm, where a liquid adhesive cannot be placed without overflowing onto an electronically sensitive part prior to and/or after compression.

Referring to an embodiment shown in FIG. 5, the liquid adhesive portions 502 are distributed along a section of the perimeter 302 where there are no existing tape adhesive portions 402. The tape adhesive portions 402 and liquid adhesive portions 502 are aligned with each other, along the length of the perimeter 302, so that during compression the different portions seal together to create a sealant 900 along the total length of the perimeter 302. Also shown is a portion of liquid adhesive 502 having a length 510 at a cross-section A along a plane y, which is further described by reference to FIGS. 9 and 10. Although the liquid adhesive is shown as having an oblong shape, other shapes of adhesive can be used including, but not limited to, spheroidal shapes having a radius that is much smaller than the length 510, with some example dimensions described later.

As further shown, between each first end 504 and second end 506 of the liquid adhesive portion 502 and an end 508 of the tape adhesive portion is a gap 512. The direction of the length of the gap 512 runs along the direction of the length of the perimeter 302. The gap 512 is repeated in between each respective liquid and tape adhesive portion throughout the perimeter 302. The size of length of the gap 512 may be consistent or may vary depending upon the exact distributed liquid adhesive quantities. During manufacturing, the length of the gap 512 is generally derived from volumetric calculations using the initial glue bead diameter and the height of a glue spacer. In a typically aggressive liquid dispense glue application, the height of the glue standoffs are in the range of 0.15-0.25 mm and the minimum glue bead diameter is at least double the standoff height. Using volumetric calculations, the width of a 0.50 mm. glue bead after compression down to a 0.20 mm shim or stand-off is about 0.8 mm. However, the glue bead typically has a 10% tolerance range of its bead diameter due to dispensing leading to over 20% growth in the width of the glue after compression. The location fixture of the housing in the glue dispensing set up adds additional tolerance. However, the largest source of variation is actually in the height of the shim itself where a shim height difference of only 0.1 mm (thickness of a piece of paper) can results in glue bead width increase of an additional 1 mm. Therefore just in this case alone, the width of the glue bead after compression could range from 0.8 mm. to almost 2 mm. The gap 512 in conjunction with the dimensions of the dispensed liquid adhesive makes room for or provides tolerance for the liquid adhesive 502 to spread without overflowing onto a display 204, for instance, during compression. Other formulas or estimates also work with embodiments described herein. For example, a gap 512 length is different when different end-types are used on the tape adhesive portions, such as those illustrated in FIG. 12.

Figure 8:
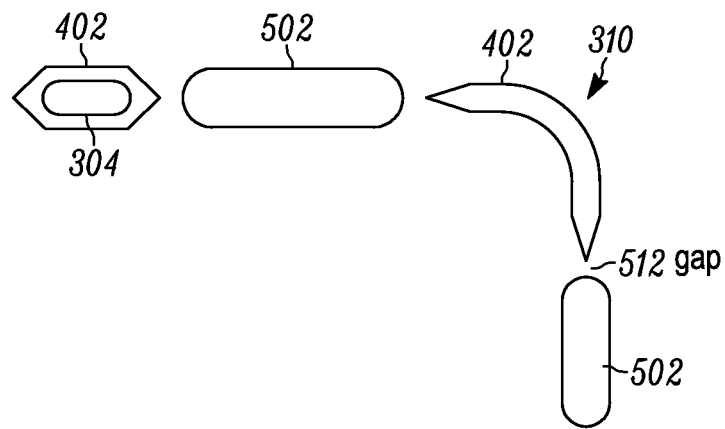
FIG. 8 illustrates a closer view of two tape adhesive portions and two liquid adhesive portions prior to compression in accordance with some embodiments.

For example, placement of the tape adhesive portions 402 with V-type ends 508 and liquid adhesive portions 502 in locations as shown in FIG. 5 and using suitably sized gaps such as gaps 512 shown in FIG. 5 and FIG. 8, enable the creation of a continuous sealant around the perimeter 302 of the second housing member 206. Continuous means uninterrupted or without a complete gap, break, or discontinuity. A gap such as the gap 512 defines a complete gap, break, or discontinuity. Accordingly, in some embodiments, where the perimeter lies along a total length around the edge of the second housing member, the one or more tape and liquid adhesive portions are placed in a manner before compression such that after compression, the set of tape adhesive portions are affixed and the at least one compressed liquid adhesive portion is distributed end-to-end with each other along the total length of the perimeter to have the sealant continuous along the perimeter. End-to-end means that each end of each tape adhesive portion is joined or physically connected and touching to an end of a compressed liquid adhesive portion and vice versa.

Figure 6:
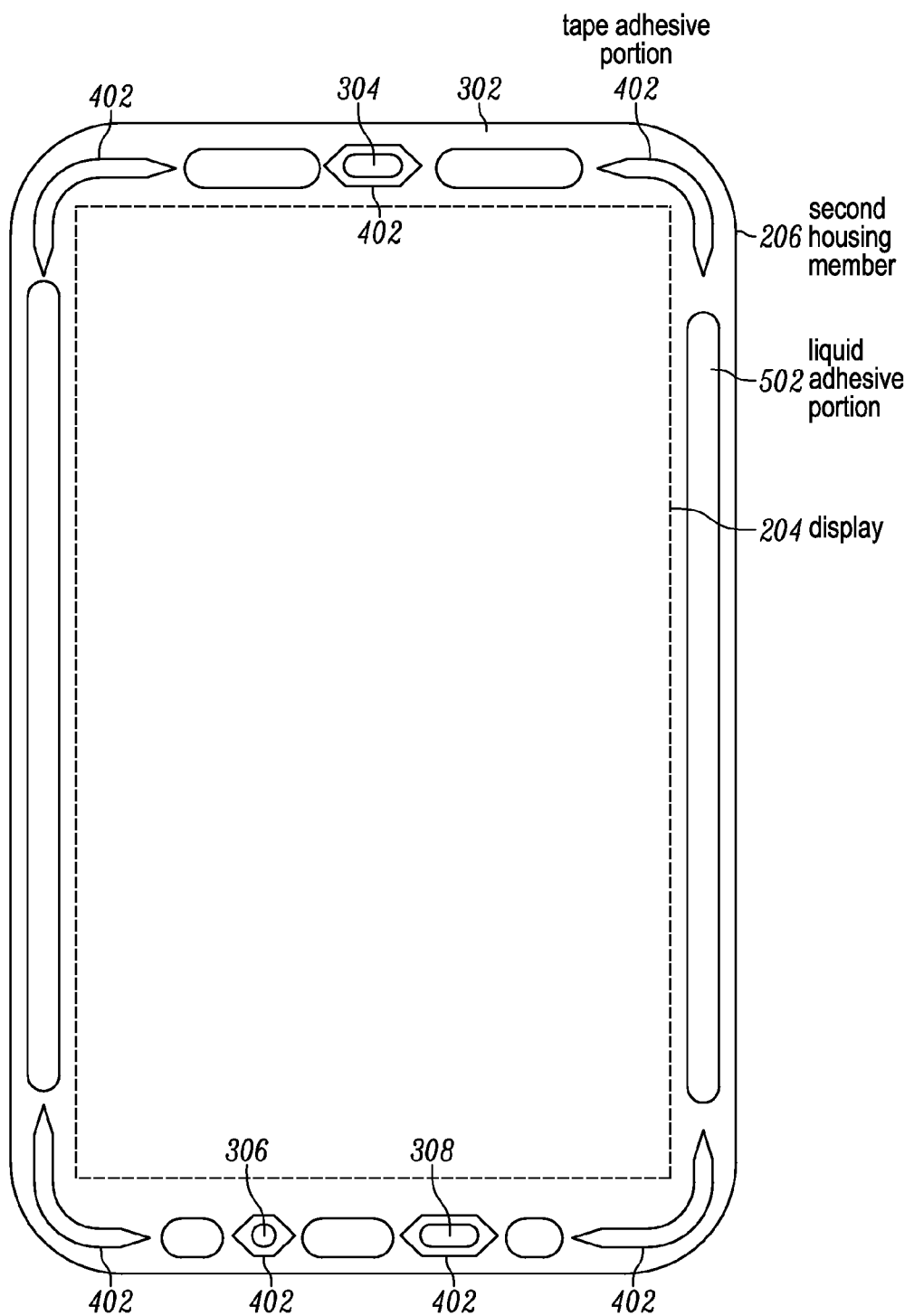
FIG. 6 illustrates a schematic that shows the positioning of a display with respect to the tape adhesive and liquid adhesive portions in accordance with some embodiments.
Figure 7:
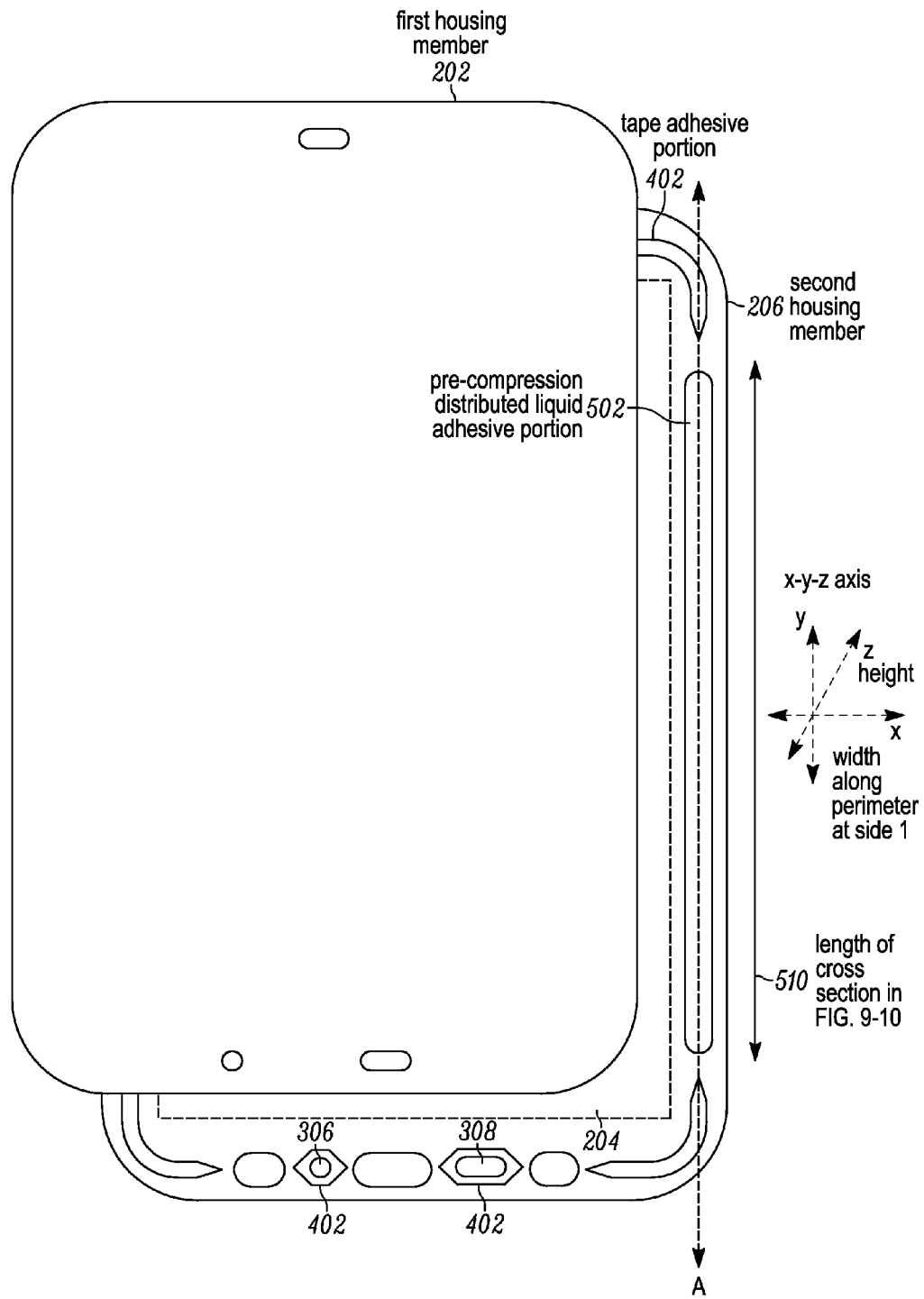
FIG. 7 illustrates a schematic of a first housing member as it is being applied to compress the tape and liquid adhesive portions in accordance with some embodiments.

FIG. 6 illustrates how the distribution of the tape and liquid adhesive portions 402, 502 maximize an area available for the display 204 while not interfering with the electronics 304, 306, and 308 located along the perimeter 302 of the second housing member 206. FIG. 7 illustrates the first housing member 202 being placed over the display 204 before a sealant is formed between the first and second housing members 202 and 206, in accordance with the present teachings. More particularly, as the display 204 is situated within or inside the perimeter 302 of the second housing member 206, the first housing member 202 is used to compress the portions of the liquid 502 and tape 402 adhesive that were respectively affixed and distributed along the perimeter 302. The compression causes the ends 504 and 506 of the liquid adhesive portions 502 to spread to join the ends 508 of the neighboring tape adhesive portions 402 to form the sealant.

The embodiment of FIG. 8 illustrates two portions each of tape 402 and liquid 502 adhesive arranged along and near a top right corner region 310 of the perimeter 302 before compression. Shown is one of the tape adhesive portions 402 surrounding the camera 304. After compression, as illustrated by reference to FIG. 9, ends of the liquid adhesive portions 502 spread to meet with respective ends of the tape adhesive portions 402 to form a sealant 900 that does not overflow onto or into the camera 304.

In general, FIG. 9 demonstrates tape adhesive portions 904 and liquid adhesive portions 902 joined end-to-end after compression to form the sealant 900. More particularly, each compressed liquid adhesive portion 902 comprises a first end 906 and a second end 908 that each join with a different end 910 of at least one of the tape adhesive portions 904. This generates an embodiment of a sealant 900 for securing a first housing member 202 to a second housing member 206 of a device 200, wherein the sealant 900 includes at least one tape adhesive portion 904 and at least one compressed liquid adhesive portion 902. The at least one tape adhesive portion 904 and the at least one compressed liquid adhesive portion 902 are arranged along the total length of a perimeter 302 of the second housing member 206 to secure the first housing member 202 to the second housing member 206. In the particular embodiment described above, at least one tape adhesive portion 904 and at least one of the compressed liquid adhesive portions 902 are arranged into a continuous sealant 900 around the entire length of the perimeter 302 of the second housing member 206. However, in other embodiments, the sealant may not be continuous. In a further embodiment, the continuous sealant 900 is water resistant. Water resistant means sealed to resist or prevent the ingress of water or other liquids, and further includes being hermetic or dust proof.

Stated another way, the end 910 of a tape adhesive portion 904 joins or physically touches with the end 906 or 908 of the compressed liquid adhesive portion 902 to form a chain of alternating tape and liquid adhesive portions that form a sealant 900 that extends continuously all around the edge of the second housing member 206 or along the entire length of the perimeter 302 to keep the second housing member 206 attached to the first housing member 202. The tape adhesive portion 904 is compressed but maintains its general shape during compression so that its height (relative to a plane z extending between the first 202 and second 206 housing members) is used as a standoff height, which sets a height of the compressed liquid adhesive portion 902, as explained in further detail below. Thus, another property of the tape adhesive portion 402 that helps control the compressed liquid adhesive portion 502 from overflow is the height of the tape adhesive portion 402. This correspondingly sets a substantially uniform height for the sealant 900 relative to the plane z extending between the first and second housing members. This, in turn, acts as a measure of control over the sections of the perimeter 302 and other parts of the device 200 into which the compressed liquid adhesive portions are allowed to extend during device manufacturing.

Figure 10:
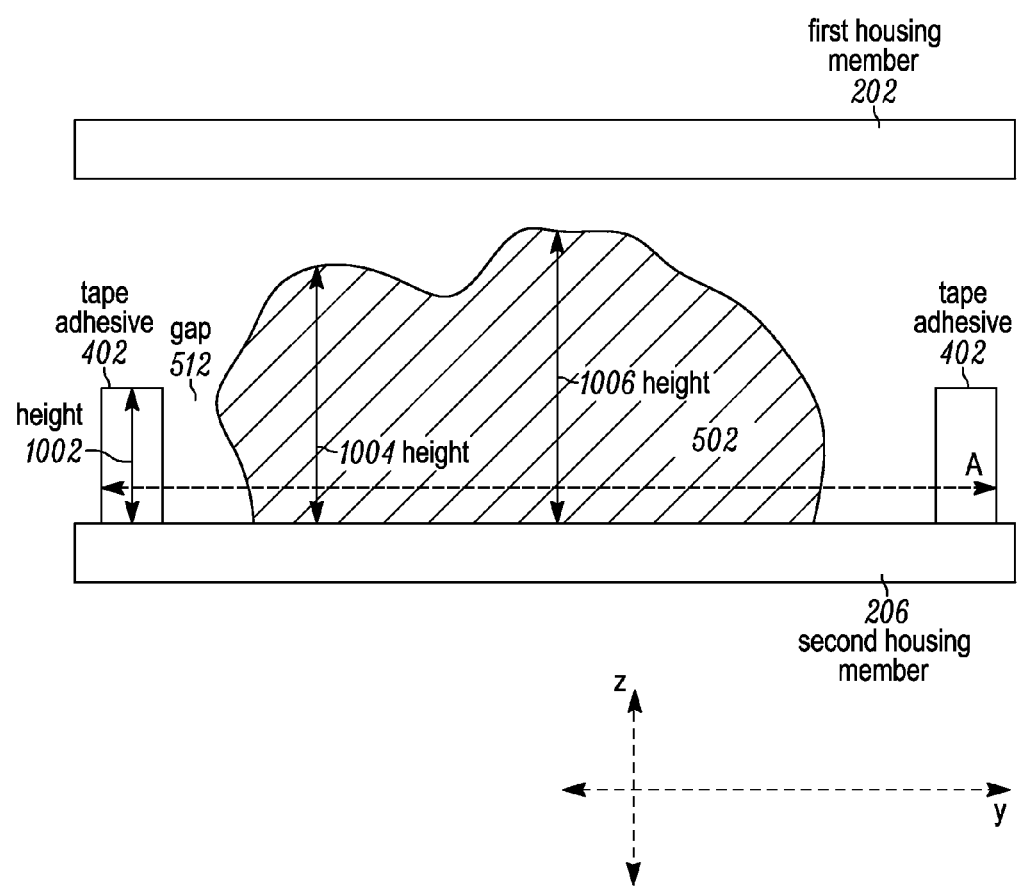
FIG. 10 illustrates a cross-section diagram, along A of FIG. 7, prior to compression, in accordance with some embodiments.

FIG. 10 illustrates the cross section along A of FIG. 7, during the manufacturing process, before the liquid adhesive portion 502 is compressed. As stated above, controlling how liquid adhesive is distributed upon the perimeter 302 of the second housing 206 has been difficult using prior art techniques. Oftentimes, the liquid adhesive comes out with variable volume and height, e.g., 1004, 1006. A minimum or smallest height of liquid adhesive 502 is generally twice as high (e.g. about 0.4-0.5 mm), as a minimum or smallest height of the tape adhesive 402 (e.g., about 0.2 mm), along a plane z between the first housing member 202 and the second housing member 204. The outline of the liquid adhesive portion 502 in FIG. 10, which shows the cross section along A of FIG. 7 is an example and is not limiting. In more realistic examples, the outline is more continuous than is depicted.

Figure 11:
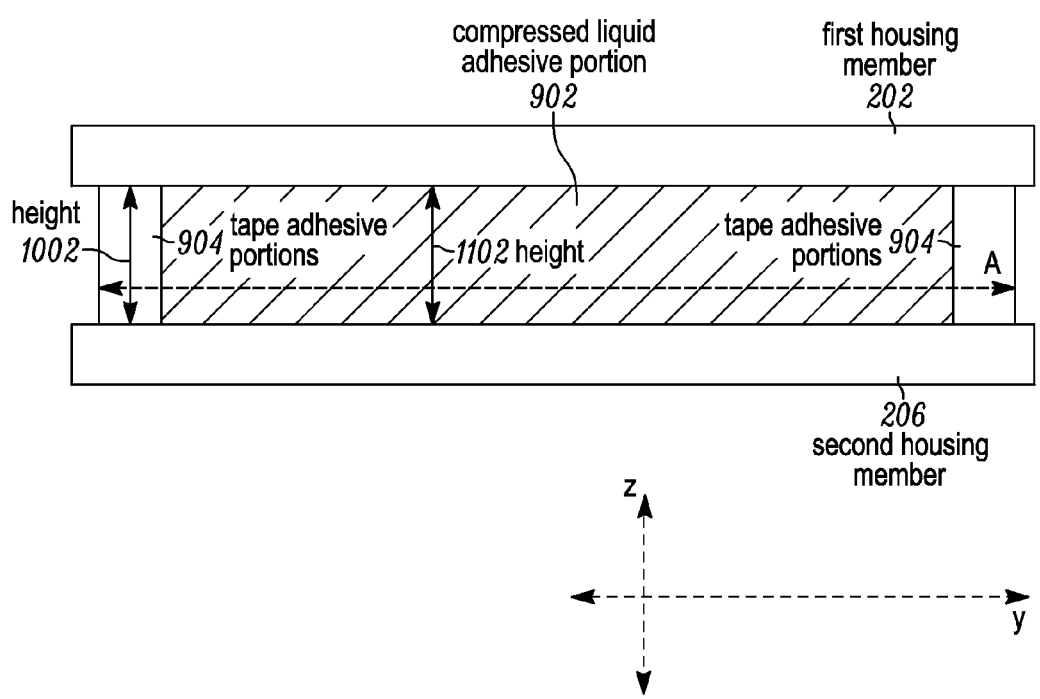
FIG. 11 illustrates a cross-section diagram, along A of FIG. 7, after compression, in accordance with some embodiments.

FIG. 11 shows the cross-section along A of FIG. 7 after compression. As illustrated in the embodiment of FIG. 11, tape adhesive height 1002 stays generally constant during compression to act as a standoff for the compression of the liquid adhesive portion 502 so that the compressed liquid adhesive portion 902 has a more controlled height 1102 after compression. In this embodiment, the first housing member 202 is used to compress the liquid adhesive 502 to form compressed liquid adhesive 902 having first 906 and second 908 ends that meet with each end 910 of the compressed tape adhesive 902 to form the sealant 900 that is continuous along the entire length of the perimeter 302. Accordingly, in the embodiment illustrated by FIGS. 10-11, the set of tape adhesive portions 402 is affixed to control a height 1102 of each compressed liquid adhesive portion 502, wherein the height 1102 is relative to a plane z between the first 202 and second 206 housing members. In another embodiment, the set of tape adhesive portions 402 is affixed to control a height 1102 of each compressed liquid adhesive portion 902 to be equivalent to a height 1002 of the tape adhesive portions 904. Thus, a height 1102 of at least one of the compressed adhesive portions 902 is controlled by a height 1002 of at least one of the tape adhesive portions 904, wherein the heights 1102, 1002 are relative to a plane z between the first 202 and second 206 housing members.

In another embodiment, at least one of the tape adhesive portions 402 is affixed to the perimeter 302 of the second housing 206 in a manner such as to prevent at least one of the compressed liquid adhesive portions 902 from extending into an electronically sensitive part of the device 200. In other words, placement of the tape and liquid adhesive (for instance as shown in FIG. 5) controls and/or minimizes a dimension of the sealant 900 to prevent the sealant from extending into electronically sensitive parts and encroaching on an area of a display 204. This allows for a greater area of the electronic device 200 to be used for the display 204 and minimizes or prevents damage to the electronically sensitive parts during the creation of the sealant. The display 204 is a type of electronically sensitive part, among others, of the electronic device 200 that is ideally clear of any liquid adhesive overflow. Other electronically sensitive parts of the electronic device 200 include the camera 304, speaker 308, microphone 306, circuitry, proximity sensor, other sensors, earpiece, imager, sensor opening, etc. The other electronically sensitive parts of any electronic device, not shown for purposes of brevity, can also be protected with the embodiments described herein.

Another advantage of some embodiments is that because the tape adhesive 402 makes up a part of the sealant 900 along the perimeter 302, the sealant 900 is capable of achieving smaller dimensions than if only the liquid adhesive 502 was used to form the sealant 900 all the way around the perimeter 302. For example, dimensions of a tape adhesive portion 402, including width, height, volume, radius, etc. are capable of smaller values than dimensions of a dispensed liquid adhesive portion 502. More particularly, as mentioned above, a width along the x plane, for example along A in FIG. 7, of a tape adhesive portion 402 in accordance with current manufacturing techniques is less than or about 0.5 mm. By contrast, a minimum or smallest width along the x plane of a distributed liquid adhesive portion 502 in accordance with current manufacturing techniques is about three times as much or 1.5 mm. Moreover, the minimum or smallest height along the z plane of a tape adhesive portion is typically about 0.2 mm. Whereas, a minimum or smallest height of a liquid adhesive portion 502 in accordance with current manufacturing techniques is about 0.4 mm.

In one example, some regions around the perimeter 302 of the second housing member 206, e.g., at the corner regions 310 near the display 304 and in regions bordering electronically sensitive parts, e.g., 304, 306, and 308, have dimensions smaller than the minimum dimensions possible for the dispensed and/or compressed liquid adhesive portions. Accordingly, in an embodiment, at least one of the tape adhesive portions 402 is affixed to a region of the perimeter 302 of the second housing member 206 having a dimension that is less than a dimension of each compressed liquid adhesive portion 902. This is possible because the tape adhesive 402 is capable of achieving dimensions that are smaller than the minimum dimensions of the compressed adhesive portion 902. Moreover, at least one of the tape adhesive portions 402 is affixed to a region of the perimeter 302 of the second housing member 206 having a dimension that is less than a minimum dimension of each compressed liquid adhesive portion 902.

Figure 12:
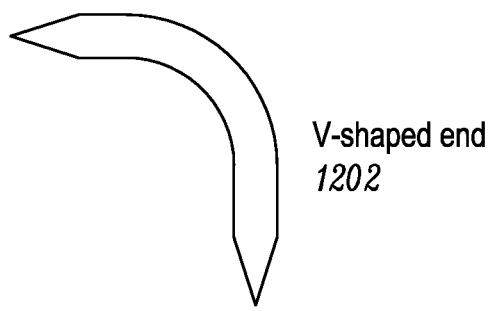
FIG. 12 illustrates a top down view of different embodiments of a tape adhesive end.
Figure 12:
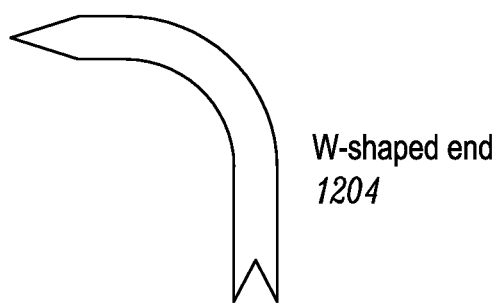
Figure 12:
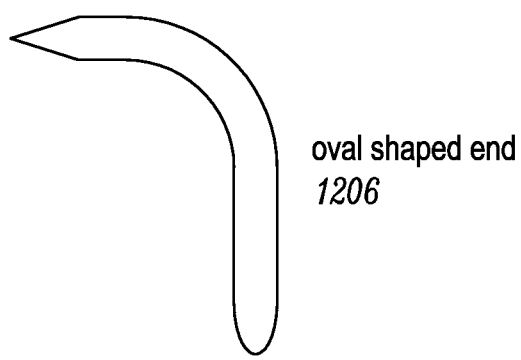

The tape adhesive portion 402 may have a straight end or the end 910 may be cut into a particular geometric shape that may help guide the liquid adhesive 502 when it is being compressed into the compressed liquid adhesive portions 902. This can help to prevent overflow into electronically sensitive parts of the device as well as assist in forming the continuity that facilitates water-resistance or a hermetic seal, for instance. In one embodiment, at least one tape adhesive portion 402 has an end that is of a V-shaped geometry, such as is indicated at 1202 in FIG. 12. Other geometries are included in the embodiments described herein, some of which are shown in FIG. 12. For example, end 2014 is a W-shaped end, and end 1206 is an oval shaped end.

Figure 13:
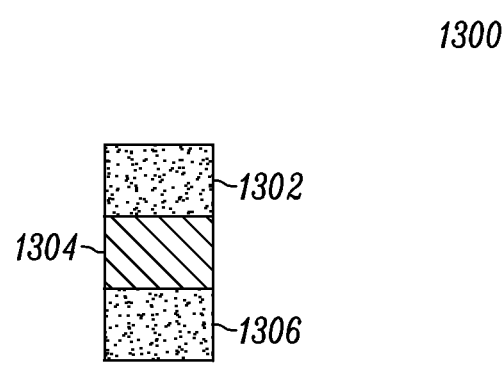
FIG. 13 illustrates a cross section of a tape adhesive showing example material components in accordance with some embodiments.

By using a tape adhesive portion 402 as part of the sealant 900, some other advantages may arise due to the different properties associated with the material of the tape adhesive itself. For example, shown in the embodiment of FIG. 13 is a tape adhesive portion comprising tape adhesive 1300. In one particular embodiment, the tape adhesive comprises two adhesive films 1302, 1306 that lay on top and bottom of a center material 1304. Generally, the center material 1304 comprises a flexible solid (i.e., non-liquid and non-viscous) material. Examples of center materials include, but are not limited to, at least one or more of: paper, plastic film, cloth, metal foil, or a foam type material, etc. The center material 1304 is coated on both sides with adhesive, such as film 1302, 1306, which may or may not be the same type of adhesive film. A film is a thin covering or coating. The adhesive film may be activated by pressure or any other method of activating adhesive properties, such as water, heat, etc. In an embodiment, at least one of the tape adhesive portions 402 comprises a pressure sensitive adhesive tape or a thermally activated adhesive tape. For example, the tape adhesive 402 is TESA 4965 or 3M9474LE, or more generally stated as a double-sided acrylic adhesive with PET middle carrier, or similar tapes including those with firm foam middle carriers such as 3M "VHB" brand adhesives. An example liquid dispensed adhesive 502 is 3M2665.

The material properties of embodiments of the tape adhesive 1300, due to one or more of its parts, may provide additional benefits to the sealant 900 over conventional sealants, such as different: elasticity, shock absorption, elastic modulus, isothermal compressibility value, or water resistant, etc. or other properties. For example, at least one of the tape adhesive portions 402 has an isothermal compressibility value that is larger than an isothermal compressibility value of a material used to construct the second housing member 206. At least one of the tape adhesive portions 402 has a better shock absorption property than a material used to construct the second housing member 206. At least one of the tape adhesive portions 402 has a lower elastic modulus than a material used to construct the second housing member 206. In some embodiments, the center material 1304, or all the materials together, 1302, 1304, 1306, may have different values for the herein described properties than the compressed liquid adhesive 902.

Shock absorption property is the ability to withstand impact and not break. Yield strain property is the ability to receive stress while not deforming. Elastic modulus property is the ability to withstand a received directed force and respond with a strain along the direction of the force with respect to the material's structure. Isothermal compressibility value is a measure of the relative volume change of a fluid or solid as a response to a pressure (or mean stress) change over a relatively stable temperature.

The different material properties associated with the embodiments of the tape adhesive 1300 may provide for additional benefits over conventional electronic device sealants. For example, if the electronic device 200 is dropped, the impact may be lessened when the sealant 900 has a standoff made of a tape adhesive 1300 having a center material 1302 that is of a foam-type instead of the conventional standoff material that is made up of the housing material. Accordingly, in an embodiment, at least one of the tape adhesive portions 402 is affixed to a region of the perimeter 302 of the second housing member 206 associated with a higher probability of detachment or breakage when the device 200 impacts a surface. For example, at least one of the tape adhesive portions 402 is affixed to a corner region 310 along the perimeter 302 of the second housing member 206, as illustrated in FIGS. 3-5.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

A method for securing a first housing member to a second housing member of a device is accomplished using embodiments of a manufacturing system which may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for securing a first housing member to a second housing member of a device, the method comprising:
    affixing a set of tape adhesive portions to a first section of a perimeter of the second housing member;
    after affixing the set of tape adhesive portions, distributing a liquid adhesive to a second section of the perimeter of the second housing member, while leaving a gap between a first end of at least one of the tape adhesive portions and a second end of the distributed liquid adhesive along the perimeter;
    after distributing the liquid adhesive, compressing the liquid adhesive into at least one compressed liquid adhesive portion, wherein the compression causes the liquid adhesive to flow into, and close, the gap between the at least one tape adhesive portion and the liquid adhesive, and to create a sealant for securing the first housing member to the perimeter of the second housing member, wherein the sealant comprises the set of tape adhesive portions and the at least one compressed liquid adhesive portion.

2. The method of claim 1, wherein the perimeter comprises a total length around an edge of the second housing member, and wherein the set of tape adhesive portions is affixed and the at least one compressed liquid adhesive portion is distributed end-to-end with each other along the total length of the perimeter to have the sealant continuous along the perimeter.

3. The method of claim 1, wherein each compressed liquid adhesive portion comprises a first end and a second end that each join with a different end of at least one of the tape adhesive portions, wherein the joining is along a total length of the perimeter of the second housing member.

4. The method of claim 1, wherein at least one of the tape adhesive portions is affixed to the perimeter of the second housing member and surrounds an electronically sensitive part of the device in a plane of the second housing member to prevent at least one of the compressed liquid adhesive portions from extending into the electronically sensitive part of the device.

5. The method of claim 1, wherein the first end of the at least one tape adhesive portion has a V-shaped geometry with a vertex of the V-shaped geometry pointing along the perimeter toward the second end of the uncompressed distributed liquid adhesive and with the vertex of the V extending into the distributed liquid adhesive after the distributed liquid adhesive has been compressed.

6. The method of claim 1, wherein the set of tape adhesive portions is affixed to control a height of each compressed liquid adhesive portion, wherein the height is relative to a plane between the first and second housing members.

7. The method of claim 6, wherein the set of tape adhesive portions is affixed to control the height of each compressed liquid adhesive portion to be equivalent to a height of the tape adhesive portions.

8. The method of claim 1, wherein at least one of the tape adhesive portions is affixed to a region of the perimeter of the second housing member having a dimension along the perimeter that is less than a dimension of the distributed liquid adhesive of each compressed liquid adhesive portion.

9. The method of claim 1, wherein at least one of the tape adhesive portions is affixed to a region of the perimeter of the second housing member having a dimension along the perimeter that is less than a minimum dimension along the perimeter of each compressed liquid adhesive portion.

10. The method of claim 1, wherein at least one of the tape adhesive portions is affixed to a region of the perimeter of the second housing member associated with a higher probability of detachment or breakage when the device impacts a surface.

11. The method of claim 10, wherein at least one of the tape adhesive portions is affixed to a corner region along the perimeter of the second housing member.

* * * * *